Jan. 28, 1958  C. W. KELL  2,821,148
RAILWAY TRUCK STRUCTURE
Filed Sept. 22, 1955  2 Sheets-Sheet 1

INVENTOR.
CLEMENT W. KELL
BY
Rodney Bedell
ATTORNEY.

Jan. 28, 1958        C. W. KELL        2,821,148

RAILWAY TRUCK STRUCTURE

Filed Sept. 22, 1955        2 Sheets-Sheet 2

INVENTOR
CLEMENT W. KELL
BY Rodney Bedell
ATTORNEY.

United States Patent Office 2,821,148
Patented Jan. 28, 1958

2,821,148

RAILWAY TRUCK STRUCTURE

Clement W. Kell, Ridley Park, Pa., assignor to General Steel Castings Corporation, Granite City, Ill., a corporation of Delaware Application September 22, 1955, Serial No. 535,822

8 Claims. (Cl. 105—190)

The invention relates to railway rolling stock and more particularly to a truck structure which utilizes a lateral motion bolster to support the vehicle body.

The invention resides in the truck frame and the mounting of the bolster thereon by hangers pivotally suspended from the truck frame and swinging transversely of the truck to accommodate lateral forces such as track irregularities, alternate curved and straight track, angular draft and buff forces, etc.

One object of the invention is to reduce the wheel base of a motor truck provided with a lateral motion bolster for supporting the truck load.

Another object is to provide adequate truck frame transverse transom structure with a minimum use of material.

Another object is to minimize the height of the body support from the rail.

The major determinate of the wheel base of a conventional motor truck, having spaced box section transoms and a bolster positioned between them, is the overall distance from the outer face of one transom to the outer face of the other transom since the transoms limit the approach of the motor housing suspension lugs toward the middle of the truck. Applicant utilizes a single relatively wide U-section transom receiving the bolster between its upright legs and thereby making it possible to shorten the wheel base an amount approximately equal to the width of two ordinary box section transoms. At the same time, frame rigidity is maintained by the wide cross bar of the U-section without requring an increased amount of metal. The upper portion of the transom is readily shaped to accommodate the application of the hangers at any desired level.

These and other detail objects of the invention will appear from the following description and the accompanying drawings, in which.

Figure 1:
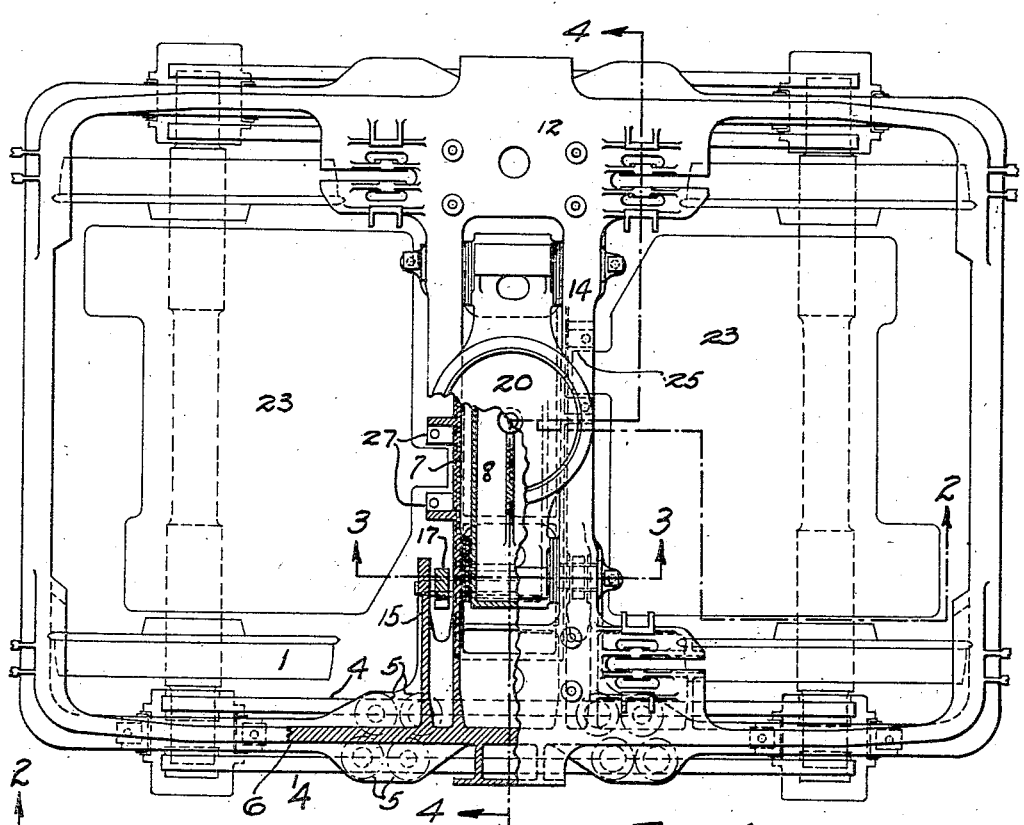
Figure 1 is a top view of a four wheel truck embodying the invention, a portion of the drawing being a horizontal section on the line 1—1 of Figure 4.
Figure 2:
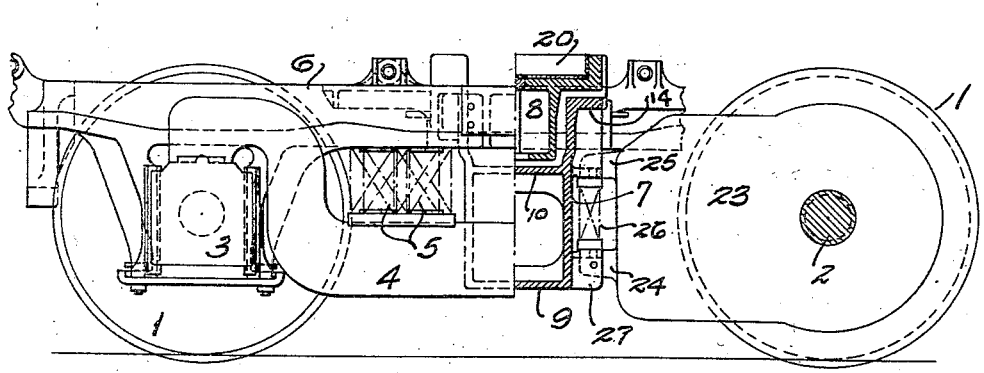
Figure 2 is a side elevation and vertical longitudinal section on the line 2—2 of Figure 1.
Figure 3:
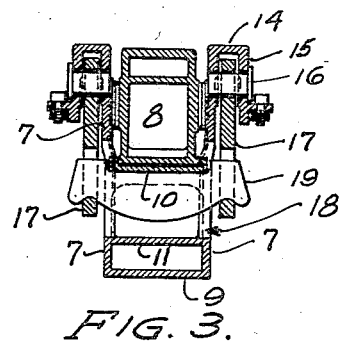
Figure 3 is a vertical longitudinal section on the line 3—3 of Figure 1.
Figure 4:
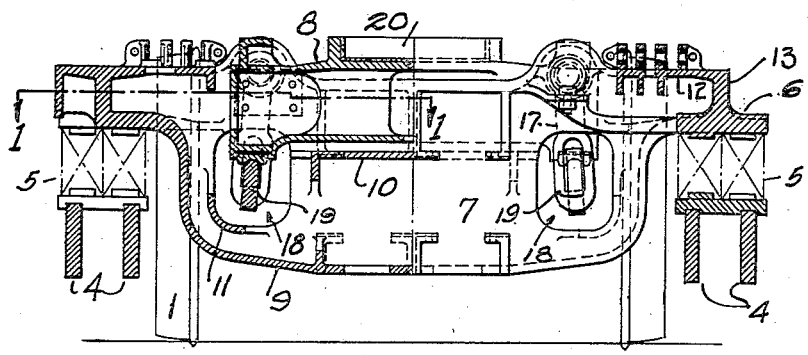
Figure 4 is a vertical transverse section on the line 4—4 of Figure 1.

The truck includes the usual assembly of wheels 1, axles 2, journal boxes 3, drop equalizers 4, equalizer springs 5, and a truck frame including wheel pieces 6, mounted on springs 5.

Extending between wheel pieces 6 is a transom structure comprising vertical webs 7 spaced apart longitudinally of the truck to receive between them a box section bolster 8. Vertical webs 7 are connected by horizontal and vertical webs 9, 10, 11, 12, 13. Preferably all of the transom structure parts and the frame wheel pieces are formed integrally in a one piece casting, thus minimizing the amount of material required to obtain sufficient strength for the loads applied to the different parts of the frame.

A lateral flange 14 projects outwardly from the upper portion of each web and at intervals has downturned extensions 15. Each web 7 and extensions 15 form bearings elongated lengthwise of the truck for pins 16 from which hangers 17 are pivotally suspended to swing transversely of the truck alongside of webs 7. Below each bearing for a pin 16 the transom web 7 is provided with an aperture 18 of sufficient depth and width to accommodate the passage therethrough of a cross bar 19 carried on the lower ends of corresponding hangers 17 and movable transversely of the truck as hangers 17 swing on their pivot pins 16. The end portions of bolster 8 are mounted upon cross bars 19. The bolster terminates inwardly of the inner ends of transom horizontal webs 12 and extends over transom horizontal webs 10. The bolster includes center plate structure 20 for supporting the vehicle body frame (not shown).

A motor is associated with each axle 2 and includes a housing 23 supported in part on the axle and having upper and lower lugs 24, 25 at its end remote from the axle. A spring unit 26, positioned between lugs 24, 25, is mounted upon brackets 27 projecting from the frame transom web 7. Brackets 27, spring units 26, and motor housing lugs 24, 25 are positioned between the ends of cross bars 19 and the lower ends of hangers 17.

With this arrangement the bolster is enclosed within the frame transom structure but is supported by hangers pivoted to swing alongside the outer faces of the transom webs, thus reducing the over-all width of the bolster and transom structure and providing increased space for brake gear and other parts, not shown, carried by the truck and depending from the vehicle body underframe. The transom structure may be arranged to position the hanger supports and cross bars and bolster at as low a level as desired.

The details of the construction may be varied to meet other conditions without departing from the spirit of the invention and the exclusive use of those modifications coming within the scope of the claims is contemplated.

What is claimed is:

1. In a railway truck, wheeled axles, a truck frame supported therefrom and including transom-forming upright webs spaced apart longitudinally of the truck and extending from side to side of the frame, swing hangers pivotally suspended from the upper portions of said transom webs to swing transversely of the truck, said hangers being positioned at the sides of said webs facing towards the ends of the truck, said webs having through apertures above the level of the lower ends of said hangers, horizontal cross bars extending through said apertures and over the lower portions of the transom-forming webs and carried on the lower portions of said hangers, and a load supporting bolster positioned between said webs and mounted on said cross bars.

2. In a railway truck having wheeled axles and a truck frame supported therefrom with transverse transom structure provided with apertures between its top and bottom, swing hangers at opposite sides of the transom structure and pivotally suspended therefrom, cross bars extending through the transom apertures and over a portion of the transom structure and carried at their ends on said swing hangers, and a load carrying bolster between transversely spaced hangers and supported on said cross bars.

3. In a railway truck, a frame including a transverse transom of general U shape cross section, a load supporting bolster positioned within said transom, swing hangers pivotally suspended from the outside of the transom, there being openings in the upright sides of the transoms, and swing hanger cross bars extending through the upright sides of the transom and supported on the hangers and supporting the bolster.

4. In a railway motor truck, spaced wheeled axles, motors with housings supported on the axles and extending therefrom towards the middle of the truck, a truck frame supported therefrom and including transom structure intermediate the axles, comprising vertical webs spaced apart lengthwise of the truck and extending from side to side of the frame, brackets on each web projecting towards the adjacent axle and forming motor housing mountings, similarly projecting bearings on each web between the brackets and the corresponding sides of the truck and positioned inboard of the axle wheels, swing hangers pivotally suspended from said bearings at opposite sides of said motor housings, said webs having apertures above their lowermost portions, cross bars extending through said web apertures and over the lower portion of the transverse structure and carried on said hangers, and a bolster between said webs carried on said cross bars.

5. A railway truck frame including wheel pieces, transom structure extending between them and comprising vetrical webs spaced apart transversely of the length of the frame far enough to receive a load supporting bolster between them, a horizontal web merging with the lower portions of said vertical webs, bearings on the upper portions of said vertical webs projecting therefrom toward the ends of the frame and adapted for mounting hanger support pins, transverse apertures in the lower portions of said webs below said bearings and adapted to accommodate the passage of bolster supporting cross bars therethrough and the movement of the same lengthwise of the transom structure.

6. A railway truck frame transom structure having a U shape cross section with upright webs spaced apart far enough to receive a load-carrying bolster between them and connected at their lower edges by a horizontal bottom web, there being transverse apertures in each of said upright webs spaced apart lengthwise of the transom structure and adapted to receive swing hanger cross bars and accommodate their movement lengthwise of the transom structure, and hanger pin bearings on the sides of said upright webs facing away from the transom structure and above the level of said apertures.

7. A railway truck frame transom one piece cast metal structure comprising spaced vertical webs, arcuate bearing members projecting laterally from the upper portions of said webs near opposite ends thereof with their axes disposed transversely of the webs, apertures in said webs near the lower portion of the structure and below said bearings, and transverse webs merging with said webs and spaced from said bearings and apertures.

8. A railway truck frame transom structure having a U-shape cross section comprising upright webs spaced apart far enough to receive a load-carrying bolster between them and connected at their lower edges by a horizontal bottom web, there being transverse apertures in each of said upright webs spaced apart lengthwise of the transom structure and adapted to receive swing hanger cross bars and accommodate their movement lengthwise of the transom structure, pin bearings on the outer sides of said upright webs and above said apertures, and support brackets for mounting motor housings between the apertures and pin bearings on each web.

References Cited in the file of this patent

UNITED STATES PATENTS

| | | |
|---|---|---|
| 2,222,321 | Pflager | Nov. 19, 1940 |
| 2,637,279 | Charlton et al. | May 5, 1953 |